United States Patent
Lee et al.

(10) Patent No.: US 10,541,401 B2
(45) Date of Patent: Jan. 21, 2020

(54) SEPARATOR FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Eon-Mi Lee, Yongin-si (KR); Jong-Hwan Park, Yongin-si (KR); Jung-Hyun Nam, Yongin-si (KR); Yeon-Joo Choi, Yongin-si (KR); Hoon Seok, Yongin-si (KR); Ae-Hui Goh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/842,716

(22) Filed: Sep. 1, 2015

(65) Prior Publication Data
US 2016/0141576 A1    May 19, 2016

(30) Foreign Application Priority Data
Nov. 19, 2014    (KR) .......................... 10-2014-0161936

(51) Int. Cl.
*H01M 2/16* (2006.01)
*H01M 10/052* (2010.01)

(52) U.S. Cl.
CPC ......... *H01M 2/1666* (2013.01); *H01M 2/166* (2013.01); *H01M 10/052* (2013.01)

(58) Field of Classification Search
CPC .............................. H02J 7/00; H01M 10/0568
See application file for complete search history.

(56) References Cited

U.S. PATENT DOCUMENTS

| | | | |
|---|---|---|---|
| 6,432,586 B1 * | 8/2002 | Zhang ................... | H01M 2/164 429/231.95 |
| 2009/0325058 A1 | 12/2009 | Katayama et al. | |
| 2011/0111280 A1 | 5/2011 | Tamakoshi et al. | |
| 2013/0302661 A1 * | 11/2013 | Kim ...................... | H01M 2/145 429/144 |
| 2014/0050965 A1 * | 2/2014 | Ha ........................ | H01M 2/164 429/144 |

(Continued)

FOREIGN PATENT DOCUMENTS

| | | |
|---|---|---|
| CN | 103247770 A | 8/2013 |
| CN | 103390740 A | 11/2013 |

(Continued)

OTHER PUBLICATIONS

EPO Search Report dated Nov. 5, 2015, for corresponding European Patent application 15184079.0, (11 pages).

(Continued)

*Primary Examiner* — Daniel S Gatewood
(74) *Attorney, Agent, or Firm* — Lewis Roca Rothgerber Christie LLP (57) ABSTRACT

A separator for a rechargeable lithium battery includes a substrate, an organic layer positioned on at least one side of the substrate and including an organic material and an inorganic layer positioned on at least one side of the substrate and including an inorganic material, wherein the organic material includes two or more kinds of organic particles having different particle sizes from each other.

13 Claims, 4 Drawing Sheets

(56) References Cited

U.S. PATENT DOCUMENTS

| | | | |
|---|---|---|---|
| 2014/0212727 A1 | 7/2014 | Hying et al. | |
| 2014/0272532 A1 | 9/2014 | Park et al. | |
| 2014/0322587 A1* | 10/2014 | Lai .................. | H01M 2/166 |
| | | | 429/145 |

FOREIGN PATENT DOCUMENTS

| | | |
|---|---|---|
| CN | 103477491 A | 12/2013 |
| EP | 2 634 836 A1 | 9/2013 |
| EP | 2 634 840 A1 | 9/2013 |
| EP | 2 662 912 A1 | 11/2013 |
| EP | 2662912 A1 | 11/2013 |
| EP | 2 779 277 A1 | 9/2014 |
| EP | 2 793 305 A1 | 10/2014 |
| EP | 2793305 A1 | 10/2014 |
| EP | 2 838 137 A1 | 2/2015 |
| EP | 2 897 198 A1 | 7/2015 |
| JP | 2010-34024 A | 2/2010 |
| JP | 2011-198532 | 10/2011 |
| JP | 2013-235824 | 11/2013 |
| JP | 2014-505344 A | 2/2014 |
| JP | 2014-67693 A | 4/2014 |
| JP | 2014-179321 A | 9/2014 |
| KR | 10-2005-0035281 A | 4/2005 |
| KR | 10-2008-0106881 A | 12/2008 |
| KR | 10-2010-0113030 A | 10/2010 |
| KR | 10-2012-0026296 A | 3/2012 |
| KR | 10-1276906 | 6/2013 |
| WO | WO 2008/143005 A1 | 11/2008 |
| WO | WO 2014/041983 A1 | 3/2014 |

OTHER PUBLICATIONS

EPO Office Action dated Aug. 10, 2018, for corresponding European Patent Application No. 15184079.0 (7 pages).
Chinese Office Action, with English translation, dated Mar. 21, 2019, for corresponding Chinese Patent Application No. 201510761649.X (17 pages).
EPO Office Action, dated May 15, 2019, for corresponding European Patent Application No. 15 184 079.0, (9 pages).
Chinese Office Action, with English translation, dated Sep. 30, 2019 for corresponding Chinese Patent Application No. 201510761649.X (13 pages).
Japanese Office Action, dated Oct. 8, 2019 for corresponding Japanese Patent Application No. 2015-206862 (3 pages).

* cited by examiner

SEPARATOR FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2014-0161936, filed in the Korean Intellectual Property Office on Nov. 19, 2014, the entire content of which is incorporated herein by reference.

BACKGROUND

1. Field

A separator for a rechargeable lithium battery and a rechargeable lithium battery including the same are disclosed.

2. Description of the Related Art

A rechargeable lithium battery includes a positive electrode, a negative electrode and a separator interposed between the positive and negative electrodes.

The separator includes micropores through which lithium ions are passed, and plays a role of electrically insulating the positive and negative electrodes.

In addition, a type (kind) of the separator may shut down the battery when the battery temperature goes over a predetermined temperature and thus, plays a role of preventing the battery from being overheated. However, such a separator may have a limit in that it does not provide sufficient insulation functions between the positive electrode and the negative electrode and/or sufficient shut-down functions due to previously generated heat and thermal runaway of a battery.

SUMMARY

An aspect of an embodiment is directed toward a separator for a rechargeable lithium battery capable of early suppressing exothermicity of a battery and preventing a short circuit between positive and negative electrodes and thus, having improved safety.

An aspect of an embodiment is directed toward a rechargeable lithium battery including the separator for a rechargeable lithium battery.

One embodiment provides a separator for a rechargeable lithium battery including a substrate; an organic layer positioned on at least one side of the substrate and including an organic material; and an inorganic layer positioned on at least one side of the substrate and including an inorganic material, wherein the organic material includes two or more kinds of organic particles having different particle sizes from each other.

The organic material may have a particle size of about 0.1 μm to about 5 μm.

The organic material may include first organic particles and second organic particles having a larger particle size than the first organic particles, a ratio of particle sizes of the first organic particles to the second organic particles may range from about 1:1.5 to about 1:7, and a weight ratio of the first organic particles to the second organic particles may range from about 10:90 to about 90:10.

The organic material may include polyolefin, a polyolefin derivative, polyolefin wax, acryl-based compound, or a combination thereof.

The organic material may have a lower melting point than that of the substrate.

The organic material may have a melting point of about 100° C. to about 130° C.

The organic layer may have a packing density of about 0.5 mg/cc to about 0.95 mg/cc.

The inorganic material may include inorganic particles including $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, aluminum nitride (AlN), silicon carbide (SiC), boron nitride (BoN), or a combination thereof.

The inorganic material may have a particle size of about 0.1 μm to about 5 μm.

The inorganic layer may have a thickness of about 1 μm to about 10 μm, and the organic layer may have a thickness of about 1 μm to about 10 μm.

At least one of the organic layer and the inorganic layer may further include a binder, and the binder may include a styrene-butadiene rubber (SBR), carboxylmethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a combination thereof.

Another embodiment provides a rechargeable lithium battery including the separator.

Other embodiments are included in the following detailed description.

In according to one or more embodiments, a rechargeable lithium battery having improved safety may be realized by applying the separator capable of early suppressing exothermicity and/or preventing a short circuit between positive and negative electrodes.

DETAILED DESCRIPTION

Hereinafter, embodiments are described in more detail. However, these embodiments are exemplary, and this disclosure is not limited thereto.

As used herein, when specific definition is not otherwise provided, it will be understood that when an element such as a surface, layer, or film is referred to as being "on" another element, it can be directly on the other element or intervening element(s) may also be present.

Hereinafter, a separator for a rechargeable lithium battery according to one embodiment is described.

The separator for a rechargeable lithium battery according to the present embodiment includes a substrate, an organic layer positioned on at least one side of the substrate, and an inorganic layer positioned on at least one side of the substrate. The organic layer includes an organic material, and the inorganic layer includes an inorganic material. The organic material includes two or more kinds of organic particles having different particle sizes from each other.

A separator is positioned between positive and negative electrodes and plays a role of preventing a direct short circuit between electrode plates and passing lithium ions through micropores in itself. This separator blocks the micropores through a shut-down function and thus, controls movement of the lithium ions when a battery becomes abnormally exothermic beyond a set or predetermined temperature. Thereby, internal resistance of the battery sharply becomes increased, and thus, the separator may suppress an electrochemical reaction and additional exothermicity of the battery.

According to one embodiment, the shut-down function of a substrate itself in the separator may be reinforced by forming an organic layer including an organic material on one side or both sides of the substrate to lower a temperature at which the shut-down function starts. Furthermore, the shut-down function of the substrate may be further reinforced by using (utilizing) two or more kinds of organic particles having different particle sizes from each other and thus, maximizing or increasing packing density. In this way, the structure of the separator reinforces the shut-down function and thus, may initially suppress exothermicity of the battery.

In addition, according to one embodiment, an inorganic layer including an inorganic material is also formed on one side or both sides of the substrate of the separator and thus, may lower a temperature when the separator is molten by exothermicity of the battery and prevent contraction of the separator. Accordingly, a short circuit between positive and negative electrodes may be prevented, and additional exothermicity due to contraction may be suppressed.

Accordingly, the separator having an organic layer including two or more kinds of organic particles having different particle sizes from each other on at least one side of a substrate and also, an inorganic layer including an inorganic material on at least one side of the substrate according to one embodiment is reinforced with a shut-, down function and may early suppress exothermicity of a battery and thus, prevent thermal contraction between positive and negative electrodes and suppress a short circuit therebetween, and resultantly, improve safety of a rechargeable lithium battery.

The separator includes the substrate, the organic layer and the inorganic layer and has no particular limit to its structure. For example, both the organic layer and the inorganic layer may be formed on only one side of the substrate or on both sides thereof, and herein, the order of the organic layer and the inorganic layer has no particular limit. In addition, both the organic layer and the inorganic layer may be formed on one side of the substrate, and the organic layer or the inorganic layer may be formed on the other side of the substrate. Furthermore, the organic layer may be formed on one side of the substrate, while the inorganic layer may be formed on the other side of the substrate.

Figure 1:
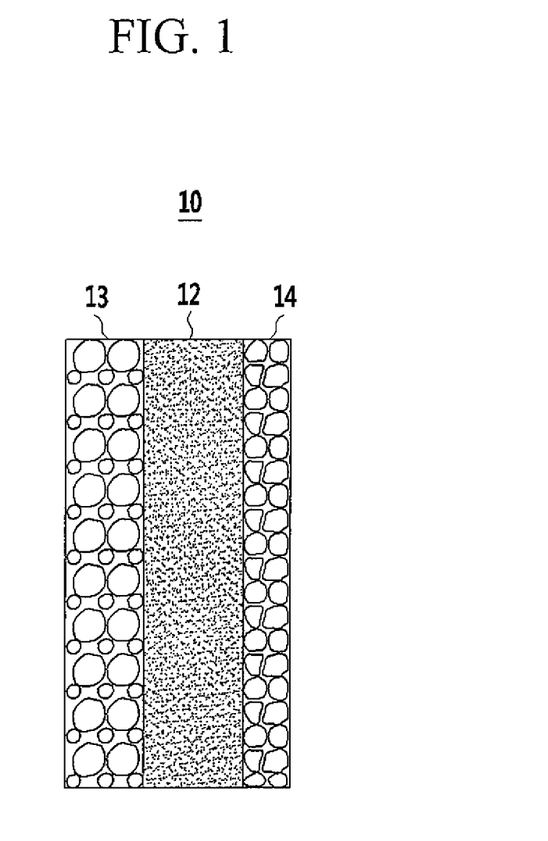
FIG. 1 is a schematic view showing the structure of a separator for a rechargeable lithium battery according to one embodiment.
Figure 2:
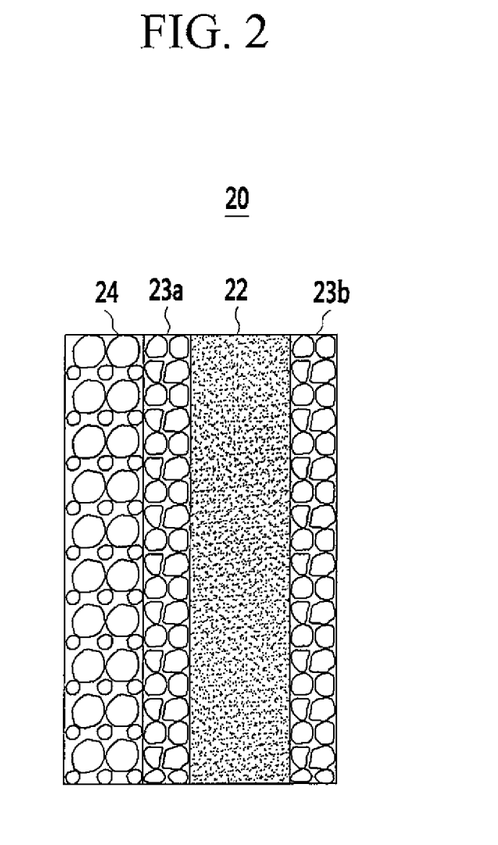
FIG. 2 is a schematic view showing the structure of a separator for a rechargeable lithium battery according to another embodiment.

Understanding of the structure may be facilitated by illustrating a part of examples in FIGS. 1 and 2.

FIG. 1 is a schematic view showing the structure of a separator for a rechargeable lithium battery according to one embodiment, and FIG. 2 is a schematic view showing a structure of a separator for a rechargeable lithium battery according to another embodiment.

Referring to FIG. 1, a separator 10 according to one embodiment has a structure including a substrate 12, an organic layer 13 positioned on one side of the substrate 12 and an inorganic layer 14 positioned on the other side of the substrate 12. In addition, referring to FIG. 2, a separator 20 according to another embodiment may include a substrate 22, inorganic layers 23a and 23b respectively on one and the other sides of the substrate 22 and an organic layer 24 on one inorganic layer 23a of the two inorganic layers 23a and 23b.

The substrate may include a polyolefin-based resin. The polyolefin-based resin may be, for example, a polyethylene-based resin, a polypropylene-based resin or a combination thereof.

The substrate may include pores. Through the pores, lithium ions may move. The substrate blocks the pores through a shut-down function when a battery is exothermic and thus, may increase internal resistance and suppress an electrochemical reaction.

The pores may have an average size of about 0.01 μm to about 1 μm, and specifically about 0.02 μm to about 0.1 μm. The average size of the pores may be measured by using a porometer. In addition, the substrate may have a porosity of about 30 volume % to about 60 volume %, and specifically about 35 volume % to about 50 volume %. When the pores have a size and porosity within the range, the substrate may have a regular porous shape unlike a non-woven fabric having an irregular porous shape in which a pore size and porosity are larger than the range. In addition, when the pore size and porosity are within the range, performance and safety of a rechargeable lithium battery may be secured by preventing an internal short circuit due to formation of lithium dendrite and minimizing or reducing movement resistance of lithium ions.

The substrate may have a thickness of about 6 μm to about 25 μm, and specifically about 7 μm to about 20 μm. When the substrate has a thickness within the range, excellent safety of a rechargeable lithium battery due to excellent physical characteristics as well as battery capacity may be secured.

The organic material forming the organic layer may include two or more kinds of organic particles having different particle sizes from each other. Specifically, the organic material may include first organic particles and second organic particles having a larger particle size (e.g., a larger average particle size) than that of the first organic particles.

A ratio of particle sizes of the first organic particles to the second organic particles may range from about 1:1.5 to about 1:7, and specifically about 1:2 to about 1:5. When the ratio of particle sizes of the first and second organic particles, that is, a size ratio (e.g., an average size ratio) of larger particles relative to that of smaller particles, is within the range, battery safety may be secured by maximizing or increasing packing density and further reinforcing the shut-down function of the substrate and thus, early suppressing exothermicity of the battery.

A weight ratio (e.g., an average weight ratio) of the first organic particles to the second organic particles may range from about 10:90 to about 90:10, and specifically about 20:80 to about 80:20. When the two particles have a weight ratio, that is, a weight ratio (e.g., an average weight ratio) of smaller particles relative to that of larger particles, is within the range, battery safety may be secured by maximizing or increasing packing density and further reinforcing the shut-down function of the substrate and thus, early suppressing exothermicity.

The organic material including two or more kinds of organic particles having different particle sizes from each other may have a particle size (e.g., an average particle size) of about 0.1 μm to about 5 μm, and specifically about 0.2 μm to about 3 μm. When the organic particles have a size within the range, the shut-down function may be further reinforced, and exothermicity of a battery may be early suppressed. The particle size indicates a diameter when each of the organic particles of the organic material has a spherical shape or a long diameter when the organic material is sheet-shaped or non-shaped.

The organic particles of the organic material may each have a sheet-shape, a spherical shape, or a non-shape, or the organic particles may have a combination thereof.

The organic material may have a lower melting point than that of the substrate. Specifically, the substrate may have a melting point ranging from about 135° C. to about 140° C., while the organic material may have a melting point ranging from about 100° C. to about 130° C. Accordingly, the organic material is melted at a lower temperature of about 100° C. to about 130° C. than that of the substrate and thus, shuts down a battery and may suppress electrochemical reactivity at a lower temperature and resultantly, early suppress exothermicity of the battery.

The organic material may include polyolefin, a polyolefin derivative, polyolefin wax, an acryl-based compound, or a combination thereof. The polyolefin may be, for example, polyethylene, polypropylene or a combination thereof. Among them, the polyethylene may be used.

The organic material may have a weight average molecular weight of about 300 g/mol to about 10,000 g/mol, and specifically about 2,000 g/mol to about 6,000 g/mol. When the organic material has a weight average molecular weight within the range, battery performance may be secured by minimizing or reducing movement resistance of lithium ions, and exothermicity of the battery may be suppressed early by reinforcing the shut-down function of a separator.

The organic layer may have a thickness of about 1 μm to about 10 μm, for example, about 2 μm to about 9 μm, or about 2 μm to about 8 μm. When the organic layer has a thickness within the range, the shut-down function of a separator may be further reinforced, and thus, exothermicity of a battery may be suppressed early.

The organic layer may further include a binder besides the organic material.

The binder may be a material that is different from the organic material, and may be, for example, a styrene-butadiene rubber (SBR), carboxylmethyl cellulose (CMC), polyvinylidene fluoride (PVdF), polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), ethylene-acrylic acid copolymer, acrylonitrile, a vinyl acetate derivative, polyethylene glycol, an acryl-based rubber, or a combination thereof.

The organic material may be included in an amount of about 70 wt % to about 99 wt %, and specifically about 80 wt % to about 98 wt % based on the total amount of the organic layer, that is, the organic material and the binder. When the organic material is included within the range, exothermicity of a battery may be suppressed early by further reinforcing the shut-down function of a separator.

The organic layer may have a packing density of about 0.5 mg/cc to about 0.95 mg/cc, and specifically about 0.7 mg/cc to about 0.85 mg/cc. When the organic layer has packing density within the range, the shut-down function of the substrate may be further reinforced, and thus, exothermicity of a battery may be early suppressed, and safety of the battery may be secured.

The inorganic material of the inorganic layer may be or include inorganic particles including $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, aluminum nitride (AlN), silicon carbide (SiC), boron nitride (BoN), or a combination thereof.

The inorganic material (including the inorganic particles) may have a particle size (e.g., an average particle size) of about 0.1 μm to about 5 μm, and specifically about 0.3 μm to about 1 μm. When the inorganic material has a particle size within the range, the inorganic material may be uniformly coated on the substrate, a short circuit between positive and negative electrodes may be suppressed by further preventing thermal contraction of a separator, and also, performance of a rechargeable lithium battery may be secured by minimizing resistance of lithium ions. Herein, the particle size refers to a diameter when each of inorganic particles of the inorganic material has a spherical shape or the longest diameter when the inorganic material has a sheet-shape or a non-shape.

The inorganic particles of the inorganic material may each have a sheet-shape, a spherical shape, or a non-shape, or the inorganic particles may have a combination thereof. For example, the inorganic material may have a non-shape. When the non-shaped particle is used, performance of a rechargeable lithium battery may be secured by minimizing or reducing resistance of lithium ions due to short tortuosity relative to that of the sheet-shaped particle.

The inorganic layer may have a thickness of about 1 μm to about 10 μm, and specifically about 2 μm to about 7 μm. When the inorganic layer has a thickness within the range, thermal contraction of the separator may be further prevented, and thus, a short circuit between positive and negative electrodes may be suppressed.

The inorganic layer may further include a binder besides the inorganic material. The binder is the same as the binder of the organic layer.

The inorganic material may be included in an amount of about 70 wt % to about 99 wt %, and specifically about 80 wt % to about 98 wt % based on the total amount of the inorganic layer, that is, the inorganic material and the binder. When the inorganic material is included within the range, a short circuit between positive and negative electrodes may be suppressed by further preventing thermal contraction of a separator. In addition, an internal short circuit due to a lithium dendrite or a foreign particle may be prevented, or battery safety may be secured by forming an electrical insulation layer.

Hereinafter, a rechargeable lithium battery including the above separator is illustrated referring to FIG. 3.

Figure 3:
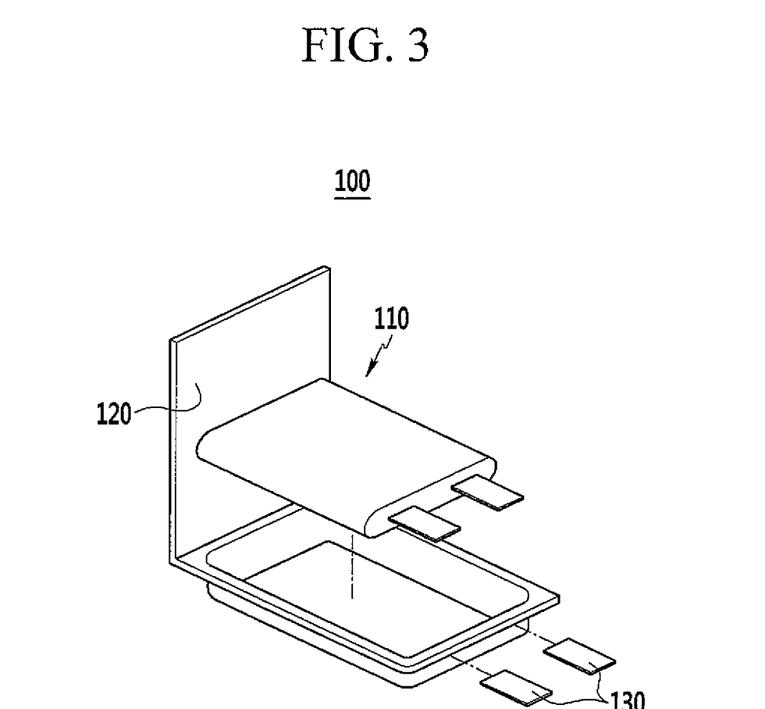
FIG. 3 is a schematic view showing a rechargeable lithium battery according to one embodiment.

FIG. 3 is a schematic view of a rechargeable lithium battery according to one embodiment of the present invention.

Referring to FIG. 3, a rechargeable lithium battery 100 according to one embodiment includes an electrode assembly 110, a battery case 120 housing the electrode assembly 110, and an electrode tab 130 electrically channeling a current generated from the electrode assembly 110 to the outside. The battery case 120 is sealed by overlapping the two sides facing each other. In addition, an electrolyte solution is injected inside the battery case 120 housing the electrode assembly 110.

The electrode assembly 110 includes a positive electrode, a negative electrode facing the positive electrode, a separator interposed between the positive electrode and the negative electrode.

The separator is the same as described above.

The positive electrode may include a current collector and a positive active material layer on the current collector.

The current collector may be aluminum, but is not limited thereto.

The positive active material layer includes a positive active material.

The positive active material includes a compound (lithiated intercalation compound) being capable of intercalating and deintercallating lithium, and specifically a lithium metal compound.

The lithium metal compound may be one or more oxides and/or phosphates including specifically at least one metal selected from cobalt, manganese, nickel and aluminum, and lithium. More specifically, compounds represented by one of the following chemical formulae may be used (utilized).

$Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$ In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The positive active material layer may include a binder and a conductive material besides the positive active material.

The binder improves binding properties of the positive active material particles to each other and to a current collector. Examples of the binder include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material provides an electrode with conductivity. Any electrically conductive material may be used as a conductive material unless it causes a chemical change. Examples of the conductive material include a carbon-based material such as natural graphite, artificial graphite, carbon black, acetylene black, ketjen black, carbon fiber or the like; a metal-based material such as a metal powder or a metal fiber or the like of copper, nickel, aluminum, silver, and/or the like; a conductive polymer such as a polyphenylene derivative or the like; and a mixture thereof.

The negative electrode includes a current collector and a negative active material layer disposed on the current collector.

The current collector may be a copper foil, but is not limited thereto.

The negative active material layer includes a negative active material, a binder and optionally a conductive material.

The negative active material may include a material that reversibly intercalates/deintercalates lithium ions, a lithium metal, a lithium metal alloy, a material being capable of doping and dedoping lithium, or a transition metal oxide.

The material that can reversibly intercalate/deintercalate lithium ions includes a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, and/or sheet, flake, spherical, and/or fiber shaped natural graphite and/or artificial graphite. The amorphous carbon may be a soft carbon, a hard carbon, a mesophase pitch carbonization product, fired coke, and/or the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, $SiO_x$ ($0 < x < 2$), a Si—C composite, a Si-Q alloy (wherein Q is an alkali metal, an alkaline-earth metal, Group 13 to Group 16 elements, a transition metal, a rare earth element, or a combination thereof, and not Si), Sn, $SnO_2$, a Sn—C composite, Sn—R (wherein R is an alkali metal, an alkaline-earth metal, Group 13 to Group 16 elements, a transition metal, a rare earth element, or a combination thereof, and not Sn), and/or the like. At least one of these materials may be mixed with $SiO_2$. The elements Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may include vanadium oxide, lithium vanadium oxide, and the like.

The binder improves binding properties of negative active material particles with one another and with a current collector. Examples of the binder include a non-water-soluble binder, a water-soluble binder, or a combination thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. Such a thickener may be included in an amount of about 0.1 parts by weight to about 3 parts by weight based on 100 parts by weight of the negative active material.

The conductive material is included to improve electrode conductivity. Any electrically conductive material may be used (utilized) as a conductive material unless it causes a chemical change. Examples of the conductive material include a carbon-based material such as natural graphite, artificial graphite, carbon black, acetylene black, ketjen black, a carbon fiber, or the like; a metal-based material of a metal powder and/or a metal fiber including copper, nickel, aluminum, silver and/or the like; a conductive polymer such as a polyphenylene derivative; and a mixture thereof.

The positive electrode and the negative electrode may be respectively manufactured by mixing each active material, the binder and the conductive material in a solvent to prepare slurry, and coating the slurry on the current collector. Herein, the solvent may be N-methylpyrrolidone, and the like, and an aqueous solvent such as water and the like may be used according to the kind of the binder, but is not limited thereto.

The electrolyte solution includes a non-aqueous organic solvent and a lithium salt.

The non-aqueous organic solvent serves as a medium for transmitting ions taking part in the electrochemical reaction of a battery. The non-aqueous organic solvent may be selected from a carbonate-based, ester-based, ether-based, ketone-based, alcohol-based and aprotic solvent.

The carbonate-based solvent may be, for example dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and/or the like.

When the carbonate-based solvent is prepared by mixing a cyclic carbonate and a linear carbonate, a solvent having a low viscosity while having an increased dielectric constant may be obtained. The cyclic carbonate and the linear carbonate are mixed together in the volume ratio of about 1:1 to 1:9.

The ester-based solvent may include, for example methyl acetate, ethyl acetate, n-propyl acetate, dimethyl acetate, methyl propionate, ethyl propionate, γ-butyrolactone, decanolide, valerolactone, mevalonolactone, caprolactone, and/or the like. The ether-based solvent may include, for example dibutylether, tetraglyme, diglyme, dimethoxyethane, 2-methyltetrahydrofuran, tetrahydrofuran, and/or the like. The ketone-based solvent may include cyclohexanone, and/or the like. The alcohol-based solvent may include ethanol, isopropyl alcohol, and/or the like.

The non-aqueous organic solvent may be used (utilized) singularly or in a mixture. When the organic solvent is used (utilized) in a mixture, the mixture ratio can be controlled in accordance with a desirable battery performance.

The non-aqueous electrolyte solution may further include an overcharge-inhibiting additive such as ethylene carbonate, pyrocarbonate, or like.

The lithium salt dissolved in the non-aqueous organic solvent supplies lithium ions in the battery, and operates a basic operation of a rechargeable lithium battery and improves lithium ion transportation between positive and negative electrodes.

The lithium salt may include one selected from $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, e.g., an integer of 1 to 20), LiCl, LiI, $LiB(C_2O_4)_2$ (lithium bis(oxalato)borate; LiBOB), and a combination thereof.

The lithium salt may be used at a concentration ranging from about 0.1 M to about 2.0 M. When the lithium salt is included at the above concentration range, an electrolyte solution may have excellent performance and lithium ion mobility due to appropriate conductivity and viscosity of an electrolyte solution.

Hereinafter, the embodiments are illustrated in more detail with reference to examples. However, the present disclosure is illustrated in more detail with reference to examples.

Furthermore, what is not described in this disclosure may be sufficiently understood by those who have knowledge in this field and will not be illustrated here.

Manufacture of Separator

Example 1

97 wt % of a mixture of 80 wt % of first polyethylene particles (Chemipearl W4005, Mitsui Chemicals, Inc.) having a melting point of 110° C., a particle size (e.g., an average particle size) of 0.6 μm, and a weight average molecular weight of 5,000 g/mol and 20 wt % of second polyethylene particles (Chemipearl W500, Mitsui Chemicals, Inc.) having a melting point of 110° C., a particle size (e.g., an average particle size) of 2.5 μm, and a weight average molecular weight of 5000 g/mol were mixed with 3 wt % of an acryl-based rubber (BM-900B, ZEON Co.) and water, preparing an organic layer composition.

An inorganic layer composition was prepared by mixing 95 wt % of sheet-shaped AlO(OH) having a particle size (e.g., an average particle size) of 0.9 μm (BMM Kawai Lime Co.) and 5 wt % of an acryl-based rubber (BM-900B, ZEON Co.) with water.

The organic layer composition was coated on one side of a porous substrate pore having an average size of 0.05 μm and porosity of 45 volume % and formed of a polyethylene material (a melting point of 135° C.) to form an organic layer, while the inorganic layer composition was coated on the other side of the substrate to form an inorganic layer, thereby manufacturing a separator. Herein, the substrate was 9 μm thick, and the organic layer was 6 μm thick while the inorganic layer was 3 μm thick. In addition, the organic layer had packing density of 0.85 mg/cc.

Example 2

An organic layer composition was prepared by mixing 97 wt % of a mixture of 80 wt % of first polyethylene particles (Chemipearl W4005, Mitsui Chemicals, Inc.) having a melting point of 110° C., a particle size (e.g., an average particle size) of 0.6 μm, and a weight average molecular weight of 5,000 g/mol and 20 wt % of second polyethylene particles (Chemipearl W401, Mitsui Chemicals, Inc.) having a melting point of 110° C., a particle size (e.g., an average particle size) of 1 μm, and a weight average molecular weight of 5,000 g/mol and 3 wt % of an acryl-based rubber (BM-900B, ZEON Co.) with water.

The organic layer composition (that was used to manufacture a separator) was manufactured to have the same structure as Example 1 according to the same method as Example 1. Herein, the substrate was 9 μm thick, and the organic layer was 6 μm thick, while the inorganic layer was 3 μm thick. In addition, the organic layer had packing density of 0.80 mg/cc.

Comparative Example 1

A separator was manufactured by coating the inorganic layer composition according to Example 1 on both sides of a porous substrate having an average pore size of 0.05 μm and porosity of 45 volume % and formed of a polyethylene material to form an inorganic layer. Herein, the substrate was 9 μm thick, and the inorganic layer on the both sides thereof was 3 μm thick in total.

Comparative Example 2

An organic layer composition was prepared by mixing 97 wt % of first polyethylene particles (Chemipearl W401, Mitsui Chemicals, Inc.) having a melting point of 110° C., a particle size (e.g., an average particle size) of 1 μm, and a weight average molecular weight of 5,000 g/mol, 3 wt % of an acryl-based rubber (BM-900B, ZEON Co.) and water.

The organic layer composition was coated on one side of a porous substrate having an average pore size of 0.05 μm and porosity of 45 volume % and formed of a polyethylene material to form an organic layer, while the inorganic layer composition according to Example 1 was coated on the other side of the substrate to form an inorganic layer, manufacturing a separator. Herein, the substrate was 9 μm thick, and the organic layer was 6 μm thick, while the inorganic layer was 3 μm thick. In addition, the organic layer had packing density of 0.62 mg/cc.

(Manufacture of Rechargeable Lithium Battery Cell)

94 wt % of a mixture of 90 wt % of $LiNi_{1/3}Co_{1/3}Mn_{1/3}O_2$ and 10 wt % of $LiNi_{0.8}Co_{0.15}Al_{0.05}O_2$ as a positive active material, 3 wt % of carbon black as a conductive material and 3 wt % of polyvinylidene fluoride as a binder were added to an N-methylpyrrolidone (NMP) solvent, thereby preparing slurry. The slurry was coated on an aluminum (Al) thin film and then, dried and roll-pressed, thereby manufacturing a positive electrode.

On the other hand, 97.5 wt % of graphite as a negative active material, 1.5 wt % of a styrene-butadiene rubber (SBR) as a binder, and 1 wt % of carboxylmethyl cellulose (CMC) were added to water as a solvent, thereby preparing a slurry. The slurry was coated on a copper foil and then, dried and roll-pressed, thereby manufacturing a negative electrode.

An electrolyte solution was prepared by mixing ethylene carbonate, ethylmethyl carbonate and dimethyl carbonate in a volume ratio of 2:4:4 and adding 1.15 M $LiPF_6$ to the mixed solvent. The positive electrode, the negative electrode and the electrolyte solution were used (utilized) along with each separator according to Examples 1 and 2 and Comparative Examples 1 and 2, respectively manufacturing a rechargeable lithium battery cell.

Evaluation 1

Thermal Resistance of Separator

Figure 4:
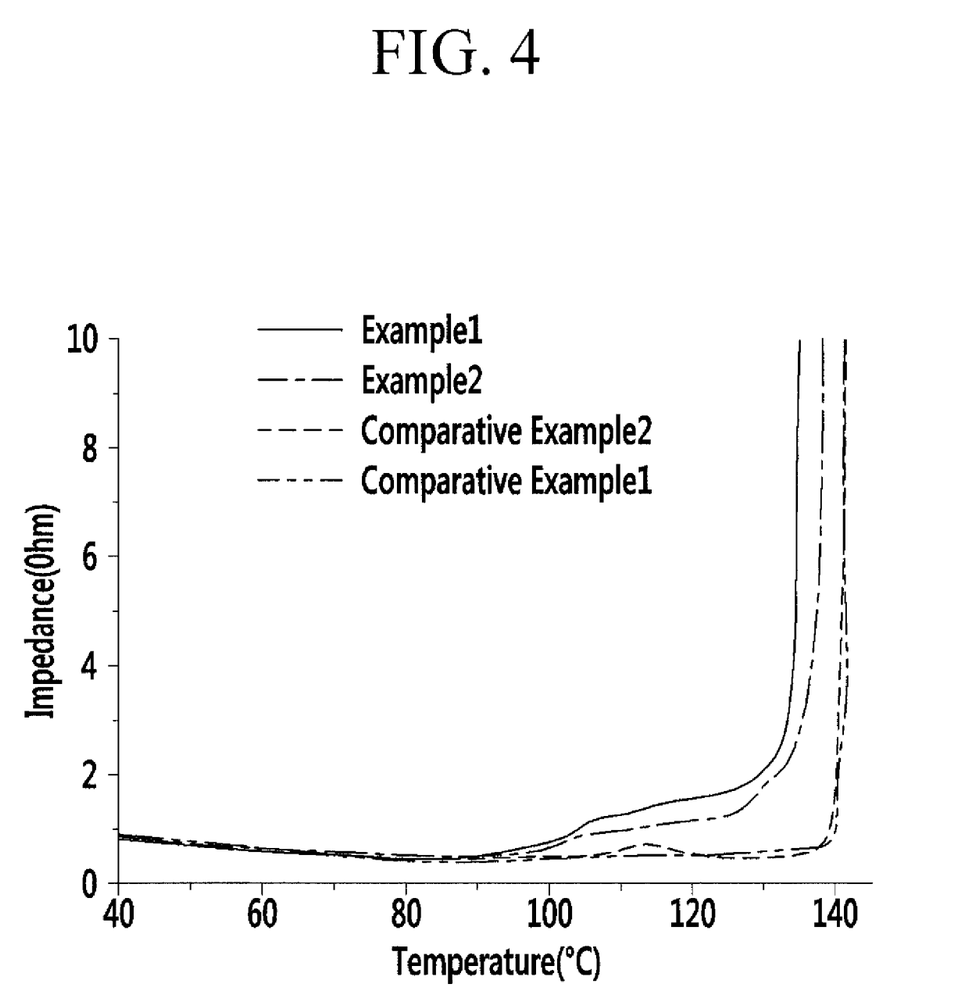
FIG. 4 is a graph showing a relationship between a temperature and resistance in each separator for a rechargeable lithium battery according to Examples 1 and 2 and Comparative Examples 1 and 2.

Resistance change of the separators according to Examples 1 and 2 and Comparative Examples 1 and 2 depending on a temperature was evaluated, and the results are provided in FIG. 4.

For reference, packing density of the organic layers of the separator of Examples 1 and 2 and Comparative Example 2 was provided in the following Table 1. The packing density was obtained by measuring weight and thickness of the separator before and after coating the organic layer and calculating density of the organic layer.

TABLE 1

|  | Packing density (mg/cc) |
| --- | --- |
| Example 1 | 0.85 |
| Example 2 | 0.80 |
| Comparative Example 1 | — |
| Comparative Example 2 | 0.62 |

FIG. 4 is a graph showing relationship between temperature and resistance of the separators for a rechargeable lithium battery cell according to Examples 1 and 2 and Comparative Examples 1 and 2.

Referring to FIG. 4 and Table 1, each separator having an organic layer including two or more kinds of organic particles having different particle sizes (e.g., different average particle sizes) from each other on at least one side of a substrate according to Examples 1 and 2 showed higher packing density and that the desired resistance started to increase at a lower temperature compared with the separator having an organic layer including one kind of an organic material according to Comparative Example 1 and the separator having no organic layer according to Comparative Example 2.

Accordingly, when a separator has an organic layer including two or more kinds of organic particles having different particle sizes from each other on at least one side of a substrate, the shut-down function of the substrate may be much reinforced, and exothermicity of a battery cell may be suppressed early.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A separator for a rechargeable lithium battery, the separator comprising:
    a substrate;
    an organic layer positioned on one side of the substrate and consisting of first organic particles, second organic particles, and a binder, the organic layer having a packing density of about 0.5 mg/cc to about 0.95 mg/cc; and
    an inorganic layer positioned on the other side of the substrate and consisting of an inorganic material and the binder,
    the second organic particles having a larger particle size and a smaller amount than the first organic particles; and
    wherein a ratio of particle sizes of the first organic particles to the second organic particles ranges from about 1:1.5 to about 1:5.

2. The separator of claim 1, wherein the first organic particles and second organic particles each have a particle size of about 0.1 μm to about 5 μm.

3. The separator of claim 1, wherein a weight ratio of the first organic particles to the second organic particles ranges from about 80:20 to about 90:10.

4. The separator of claim 1, wherein the first organic particles and second organic particles each comprise polyolefin, a polyolefin derivative, polyolefin wax, an acryl-based compound, or a combination thereof.

5. The separator of claim 1, wherein the substrate has a melting point of about 135° C. to about 140° C.

6. The separator of claim 1, wherein the first organic particles and second organic particles each have a melting point of about 100° C. to about 130° C.

7. The separator of claim 1, wherein the organic layer has a packing density of about 0.7 mg/cc to about 0.85 mg/cc.

8. The separator of claim 1, wherein the inorganic material comprises inorganic particles comprising $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, aluminum nitride (AlN), silicon carbide (SiC), boron nitride (BoN), or a combination thereof.

9. The separator of claim 1, wherein the inorganic material has a particle size of about 0.1 μm to about 5 μm.

10. The separator of claim 1, wherein the inorganic layer has a thickness of about 1 μm to about 10 μm, and
the organic layer has a thickness of about 1 μm to about 10 μm.

11. The separator of claim 1, wherein the binder comprises a styrene-butadiene rubber (SBR), carboxylmethyl cellulose (CMC), polyvinylidene fluoride (PVdF), polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber or a combination thereof.

12. A rechargeable lithium battery comprising the separator of claim 1.

13. The separator of claim 1, wherein a ratio of particle sizes of the first organic particles to the second organic particles ranges from about 1:2 to about 1:5.

* * * * *